United States Patent
Abdullah et al.

(10) Patent No.: US 11,539,452 B2
(45) Date of Patent: Dec. 27, 2022

(54) SIGNALING THE DISTRIBUTED 1588V2 CLOCK ACCURACY RELATIVE TO UTC

(71) Applicant: Ciena Corporation, Hanover, MD (US)

(72) Inventors: Bashar Abdullah, Kanata (CA); PengJoo Tan, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 2 days.

(21) Appl. No.: 17/335,484

(22) Filed: Jun. 1, 2021

(65) Prior Publication Data

US 2022/0385389 A1 Dec. 1, 2022

(51) Int. Cl.
*H04J 3/06* (2006.01)
*H04L 47/32* (2022.01)

(52) U.S. Cl.
CPC .......... *H04J 3/0667* (2013.01); *H04J 3/0641* (2013.01); *H04J 3/0697* (2013.01); *H04L 47/32* (2013.01)

(58) Field of Classification Search
USPC ....................................................... 370/503
See application file for complete search history.

(56) References Cited

U.S. PATENT DOCUMENTS

| | | | |
|---|---|---|---|
| 7,333,508 B2 | 2/2008 | Rabie et al. | |
| 7,406,088 B2 | 7/2008 | Magd et al. | |
| 7,417,995 B2 | 8/2008 | Rabie et al. | |
| 7,565,436 B2 | 7/2009 | Rabie et al. | |
| 8,018,841 B2 | 9/2011 | Holness et al. | |
| 8,305,938 B2 | 11/2012 | Holness et al. | |
| 8,687,633 B2 | 4/2014 | Rabie et al. | |
| 9,401,817 B2 | 7/2016 | Holness et al. | |
| 9,843,439 B2 | 12/2017 | Rivaud et al. | |
| 10,355,799 B2 | 7/2019 | Abdullah et al. | |
| 10,594,395 B2 | 3/2020 | Abdullah et al. | |
| 2005/0141509 A1 | 6/2005 | Rabie et al. | |

(Continued)

FOREIGN PATENT DOCUMENTS

| | | |
|---|---|---|
| EP | 2 460 320 B1 | 7/2009 |
| EP | 2 430 798 B1 | 5/2010 |

(Continued)

OTHER PUBLICATIONS

NPL document "IEEE Standard for a Precision Clock Synchronization Protocol for Networked Measurement and Control Systems", approved and published on Nov. 7, 2019, (hereinafter 1588) (Year: 2019).*

(Continued)

*Primary Examiner* — Gregory B Sefcheck
*Assistant Examiner* — Majid Esmaeilian
(74) *Attorney, Agent, or Firm* — Clements Bernard Baratta; Lawrence A. Baratta, Jr.; Christopher L. Bernard

(57) ABSTRACT

A network element includes circuitry configured to receive information related to clock distribution from Precision Time Protocol (PTP) messages from an upstream network element, determine a delta between a network clock from the information and a Primary Reference Time Clock (PRTC), and transmit the delta in PTP messages to downstream network elements. The circuitry can be further configured to receive a configuration of a clock class of a clock at the network element, and transmit the clock class in the PTP messages with the delta. The clock class can be one of A, B, C, and D from G.8273.2 or G.8273.4.

15 Claims, 4 Drawing Sheets

(56) References Cited

U.S. PATENT DOCUMENTS

| | | | |
|---|---|---|---|
| 2013/0227172 A1* | 8/2013 | Zheng | H04J 3/0667 709/248 |
| 2013/0272708 A1* | 10/2013 | Mizuguchi | H04B 10/25 398/71 |
| 2016/0020863 A1* | 1/2016 | Kim | G07C 5/006 701/32.7 |
| 2016/0149692 A1* | 5/2016 | Kim | H04L 12/4625 370/503 |
| 2019/0141056 A1 | 5/2019 | Estabrooks et al. | |
| 2020/0288420 A1* | 9/2020 | Zhu | H04W 56/005 |
| 2021/0119717 A1* | 4/2021 | Li | H04W 56/001 |
| 2021/0165946 A1* | 6/2021 | Chae | G06F 30/3312 |

FOREIGN PATENT DOCUMENTS

| | | |
|---|---|---|
| EP | 1 706 970 B1 | 7/2010 |
| EP | 2 417 735 B1 | 6/2017 |
| WO | 2005069540 A1 | 7/2005 |

OTHER PUBLICATIONS

Calnex Solutions Ltd, "Implementing IEEE 1588v2 for use in the mobile backhaul," Technical Brief, 2009, pp. 1-24.

* cited by examiner

SIGNALING THE DISTRIBUTED 1588V2 CLOCK ACCURACY RELATIVE TO UTC

FIELD OF THE DISCLOSURE

The present disclosure generally relates to timing distribution in networks. More particularly, the present disclosure relates to systems and methods for signaling the distributed IEEE 1588v2 clock accuracy relative to Coordinated Universal Time (UTC).

BACKGROUND OF THE DISCLOSURE

IEEE 1588v2 (2008), IEEE Standard for a Precision Clock Synchronization Protocol for Networked Measurement and Control Systems, the contents of which are incorporated by reference, referred to as Precision Time Protocol (PTP) is a common technique to synchronize clocks throughout a network. There is no known technique to convey the accuracy of either a clock or synchronous device to downstream devices or applications. In fact, there has not been a need for this information prior to the 3GPP class of service definition with 3GPP TS 38.300 Release-15 published in June 2018, the contents of which are incorporated by reference. Although IEEE 1588v2 specifies a clockAccuracy enumeration, it is to be used by a network engineer to configure the accuracy of the Grand Master (GM) device only, and it ranges between 25 ns up to 10 s in variable steps ranging from 75 ns up to 10 s. This does not, and cannot, and per the specification must not be used by non-GM clocks in the network to convey their own accuracy. Furthermore, the granularity of this enumeration is insufficient to convey the accuracy for the 3GPP Radio Access Network (RAN) application.

BRIEF SUMMARY OF THE DISCLOSURE

The present disclosure relates to systems and methods for signaling the distributed IEEE 1588v2 clock accuracy relative to Coordinated Universal Time (UTC). The present disclosure extends messaging in IEEE 1588v2 (hereinafter referred to as 1588v2) to convey a class of a device for downstream applications to identify clock accuracy. For example, ITU-T Recommendation G.8273.2: Timing characteristics of telecom boundary clocks and telecom time slave clocks for use with full timing support from the network, October 2020, and ITU-T Recommendation G.8273.4: Timing characteristics of telecom boundary clocks and telecom time slave clocks for use with partial timing support from the network, March 2020, the contents of each are incorporated by reference, define a class of a device in order for downstream applications to identify whether the accuracy of the clock is within 5 ns (Class D), 10 ns (Class C), 30 ns (Class B), or 50 ns (Class A) of its clock reference. This can be referred to herein as the G.8273.2 or G.8273.4 class. The present disclosure can include a Type-Length-Value (TLV) extension to 1588v2 ANNOUCE Protocol Data Units (PDU), or another signaling PDU, to convey the G.8273.2 or G.8273.4 class. In another embodiment, the present disclosure can include signaling measured accuracy of a clock relative to UTC, along a timing trail, when available, in this same TLV extension, another TLV extension, or in an independent TLV extension. This can be used in a packet network to interoperate in a 5G Radio Access Network (RAN) for fronthaul applications, where Radio Units (RUs) and Distributed Units (DUs) need to exchange this information and enable the DU to configure advanced 3GPP services on the RUs.

In an embodiment, a network element includes circuitry configured to receive information related to clock distribution from Precision Time Protocol (PTP) messages from an upstream network element, determine a delta between a network clock from the information and a Primary Reference Time Clock (PRTC), and transmit the delta in PTP messages to one or more downstream network elements. The circuitry can be further configured to receive a configuration of a clock class of a clock at the network element, and transmit the clock class in the PTP messages with the delta. The clock class can be one of A, B, C, and D from G.8273.2 or G.8273.4. Each of the one or more downstream network elements can include a device that uses any of the delta and the clock class for applications.

The circuitry can be further configured to receive one or more of a delta determined by one or more upstream network elements and a clock class of a clock at the upstream network element in the PTP messages from the one or more upstream network elements, and select a timing path from the one or more upstream network elements based on the one or more of the delta and the clock class. The PRTC can be a Coordinated Universal Time (UTC) from a Global Navigation Satellite System (GNSS) receiver. The PTP messages can be signaling Protocol Data Units (PDUs). The delta can be included in a Type-Length-Value (TLV) in the PTP messages.

In another embodiment, a method includes receiving information related to clock distribution from Precision Time Protocol (PTP) messages from an upstream network element, determining a delta between a network clock from the information and a Primary Reference Time Clock (PRTC), and transmitting the delta in PTP messages to one or more downstream network elements. The method can further include receiving a configuration of a clock class of a clock at the network element, and transmitting the clock class in the PTP messages with the delta. The clock class can be one of A, B, C, and D from G.8273.2 or G.8273.4. Each of the one or more downstream network elements can include a device that uses any of the delta and the clock class for applications.

The method can further include receiving one or more of a delta determined by one or more upstream network elements and a clock class of a clock at the upstream network element in the PTP messages from the one or more upstream network elements, and selecting a timing path from the one or more upstream network elements based on the one or more of the delta and the clock class. The PRTC can be a Coordinated Universal Time (UTC) from a Global Navigation Satellite System (GNSS) receiver. The PTP messages can be signaling Protocol Data Units (PDUs). The delta can be included in a Type-Length-Value (TLV) in the PTP messages.

In a further embodiment, a network element includes circuitry configured to receive information related to clock distribution from Precision Time Protocol (PTP) messages from a plurality of upstream network elements, wherein each PTP message from a given upstream network element includes one or more of i) a delta between a network clock and a Primary Reference Time Clock (PRTC) at the given upstream network element, and ii) a clock class of a clock at the given upstream network element, and determine a timing path based on any of the delta and the clock class of the plurality of upstream network element.

The circuitry can be further configured to configure an application based on any of the delta and the clock class. The PTP messages can be signaling Protocol Data Units (PDUs). The delta can be included in a Type-Length-Value (TLV) in the PTP messages.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
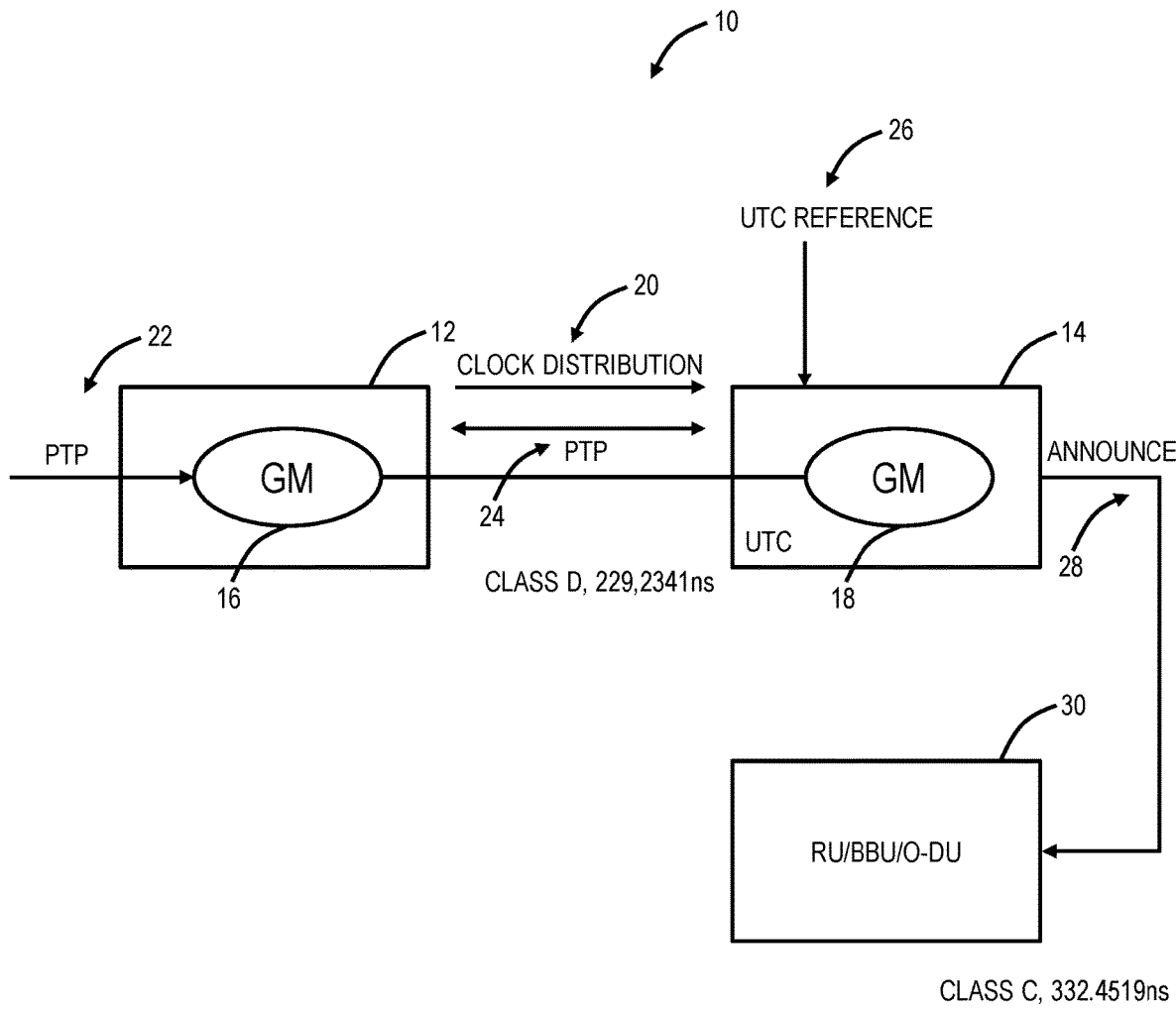
FIG. 1 is a network diagram of a portion of a network including two network elements for illustrating signaling of clock accuracy.

The present disclosure relates to systems and methods for signaling the distributed IEEE 1588v2 clock accuracy relative to Coordinated Universal Time (UTC). The present disclosure extends messaging in IEEE 1588v2 (hereinafter referred to as 1588v2) to convey a class of a device for downstream applications to identify clock accuracy. For example, ITU-T Recommendation G.8273.2: Timing characteristics of telecom boundary clocks and telecom time slave clocks for use with full timing support from the network, October 2020, and ITU-T Recommendation G.8273.4: Timing characteristics of telecom boundary clocks and telecom time slave clocks for use with partial timing support from the network, March 2020, the contents of each are incorporated by reference, define a class of a device in order for downstream applications to identify whether the accuracy of the clock is within 5 ns (Class D), 10 ns (Class C), 30 ns (Class B), or 50 ns (Class A) of its clock reference. This can be referred to herein as the G.8273.2 or G.8273.4 class. The present disclosure can include a Type-Length-Value (TLV) extension to 1588v2 ANNOUCE Protocol Data Units (PDU) to convey the G.8273.2 or G.8273.4 class. In another embodiment, the present disclosure can include signaling measured accuracy of a clock relative to UTC, along a timing trail, when available, in this same TLV extension, another TLV extension, or in an independent TLV extension. This can be used in a packet network to interoperate in a 5G Radio Access Network (RAN) for fronthaul applications, where Radio Units (RUs) and Distributed Units (DUs) need to exchange this information and enable the DU to configure advanced 3GPP services on the RUs.

Conventionally, Synchronization Status Message (SSM), Ethernet Synchronization Message Channel (ESMC) Quality Level (QL), or 1588v2 clockClass values that are signaled in all synchronization protocols (e.g., Synchronous Ethernet (SyncE) SSM, Building Integrated Timing Supply (BITS) QL, 1588v2 clockClass) are only able to signal the qualitative value of the clock source, not the quantitative accuracy of a clock at each point in the network as the clock is being distributed. As clocks are distributed in a network, noise is generated and transferred, and time error is accumulated. The original clock accuracy at the clock source is conveyed as a qualitative representation using the clockAccuracy TLV.

It is incumbent on a network operator to measure the accuracy of the clock at timing trail endpoints in the network to determine whether the network timing architecture is adequate to meet the performance requirements of the application(s). If a device in the network is capable of both measuring its performance and signaling that information to downstream devices/applications, the end applications could adapt to the quality of the clock in order to enhance or degrade their services.

For example, a 3GPP-compliant Open-RAN (O-RAN) RU (O-RU) must signal to its O-RAN DU (O-DU) its clock accuracy, in addition to the qualitative clockClass. The clockClass alone is insufficient to convey the accuracy of the clock. An O-RU connected to an O-DU via G.8273.2 Class A devices could contribute up to 50 ns of time error for each network element. In contrast using G.8273.2 Class C devices could contribute up to 10 ns of time error for each network element. Assuming two hops between 0-RU and O-DU, G.8273.2 Class C devices would accumulate no more than 20 ns of time error, whereas G.8273.2 Class A devices would accumulate no more than 100 ns of time error. A clock that is being distributed with a clockClass of 7 (Primary Reference Time Clock (PRTC) traceable), and a clockAccuracy of 20 (representing 25 ns accuracy) does not convey that these clocks are accumulating their respective time error over each hop they traverse.

Using G.8273.2 Class C devices would allow 0-RUs to support more advanced 3GPP Class A, B and C services, such as carrier aggregation, Multiple-Input and Multiple-Output (MIMO) and transmitter diversity to enable higher capacity thus generating increased revenue potential for the mobile operator. Whereas, if G.8273.2 Class A devices were used, it would only allow for 3GPP Class C services, translating to lower capacity and thus lower revenue generating opportunity. Furthermore, an O-RU that does not have a sufficiently accurate clock to support the higher 3GPP classes of services, must not have their Radio Frequency (RF) signals configured by their 0-DU to operate in those service modes. The consequence of doing so is interference with other radios and loss of service altogether.

Accordingly, the present disclosure provides a capability to the 1588v2 protocol to enable the conveyance of this information to enable devices and applications to effect their operations.

In a 1588v2 network, the protocol only defines an ability to identify the quality level of the clock that is being distributed based on the clock source using a qualitative measure called clockClass. The clockClass can have a value in the range of 1 to 255. The lower the clockClass value the more accurate the clock source is. But the clockClass does not reflect the accuracy of the clocks being distributed, nor the class of the device distributing the clocks. This has operational impacts on 3GPP networks, where Radio Equipment (RE) must signal back to their Radio Equipment Controller(s) (REC) what is the accuracy of the clock being received in order for the REC to configure the appropriate RF services that can be supported on the RE. The 1588v2 protocol that is widely used to distribute clocks in numerous network environments and for countless applications has no ability to convey this information across the network.

Again, in an embodiment, the present disclosure provides a TLV extension to the 1588v2 ANNOUNCE PDU to convey the G.8273.2 or G.8273.4 class of a device in order for downstream applications to identify whether the accuracy of the clock is within 5 ns (Class D), 10 ns (Class C), 30 ns (Class B) or 50 ns (Class A) of its clock reference. In another embodiment, the present disclosure can signal a measured accuracy of a clock relative to UTC along a timing trail, when available, in this same TLV extension.

FIG. 1 is a network diagram of a portion of a network 10 including two network elements 12, 14 for illustrating signaling of clock accuracy. In this example, the network elements 12, 14 can be packet switching utilizing the 1588v2 protocol for clock distribution, and each of the network elements 12, 14 include a clock 16, 18, respectively. The clocks 16, 18 can be PTP grandmaster clocks, an Ordinary Clock (OC), a Boundary Clock (BC), etc., as either a master or slave. Also, in this example, clock distribution 20 is from the network element 12 to the network element 14. The network element 12 can receive PTP messages 22 from upstream and transmit PTP messages 24 downstream to the network element 14.

The network element 12 recovers a network clock from the PTP messages 22, utilizes the recovered network clock to synchronize the clock 16, and distributes the recovered network clock via the PTP messages 24 to the network element 14. Again, the present disclosure modifies the PTP messages 22, 24 to enable the network elements 12, 14, that can measure their clock accuracy or have it configured by a network operator, to use this information to convey to downstream devices and applications to affect their operation.

The network element 14 receives the PTP messages 24 from the network element 12 for synchronizing the clock 18. Additionally, the network element 14 is configured to measure its clock 18 accuracy. The network element 14 can receive a UTC reference 26, such as via a Global Navigation Satellite System (GNSS) receiver including a Global Positioning Satellite (GPS) receiver. The network element 14 can perform a measurement that compares the network phase and time clocks against the UTC reference 26 from the local PRTC (i.e., GNSS receiver). The phase and time offset represents the accuracy of the clock that is to be distributed via 1588v2 to downstream devices/applications.

The network element 14 performs the measurement and can convey this information via the 1588v2 ANNOUNCE PDUs 28, which are transmitted on a regular interval—nominally once every 128 seconds up to 4 times per second and user configurable with some 1588v2 profiles (e.g., 802.1AS, AES67, 802.1AVB, CS37.238, IEC 61850-9-3, G.8265.1, G.8275.2), and fixed at once every 2 seconds for other 1588v2 profiles (e.g., G.8275.1)—to downstream clocks.

Assume the network element 14 is connected to a device 30, such as an RU, O-DU, Baseband Unit (BBU), etc. A downstream clock, at the device 30, knowing the accuracy of the clocks being recovered could then use this information to enhance or degrade their operation depending on the application specific features. For example, for 3GPP 5G New Radios (NRs), to have their RF signals configured for intra-band carrier aggregation, the NRs would be required to recover a clock with an accuracy not exceeding 45 ns.

A network element that is capable of measuring and signaling its accuracy information could convey its G.8273.2 or G.8273.4 clock class representing its constant time error (cTE) contribution to the clock it is distributing (e.g., Class C cTE=10 ns), but if it can also measure its clock relative to a UTC reference, it can convey its true accuracy to provide an even more robust solution. That is, the more accurate the clock, the more services that can be enabled in spectrum. This clock accuracy information is used to turn on services more dynamically. This embedded capability provides real-time and full coverage of the timing.

The UTC reference 26 provides a network-wide timing reference, e.g., a PRTC, whereas the clock class is a node-by-node timing accuracy representation.

The 1588v2 ANNOUNCE PDUs are transmitted periodically by a 1588v2 GM clock to downstream 1588v2 Boundary Clocks (BCs) or Ordinary Clocks (OCs). BC's and OC's can select which GM to recover their clocks from based on the information conveyed in the ANNOUNCE PDUs.

The ANNOUNCE PDU as specified by 1588v2 defines the following attributes:
originTimestamp (i.e., current time of day)
currentUtcOffset (i.e., epoch (TAI or UTC)—UTC)
grandmasterPriority1
grandmasterClockQuality (i.e., enumerated clockClass (1 . . . 255))
grandmasterPriority2
grandmasterIdentity (i.e., MAC address)
stepsRemoved (number of hops from the GM)
timeSource (enumerated (1 . . . 255) e.g., atomic clock, GPS, PTP, NTP, Internal oscillator)

A new clockAccuracyUtc TLV would add a G.8273.2 or G.8273.4 clock class (e.g., A, B, C, D) and a measured clock accuracy relative to UTC. ANNOUNCE PDU includes accuracy class and measured delta, e.g., ANNOUCE TLV (CLASS, MEASURED DELTA), ANNOUNCE TLV (Class C, 332.4519 ns).

For devices and applications that require this information to operate correctly, would process the clockAccuracyUtc TLV to extract the information to make their determination on usability of the clocks. This information may also be used by the devices/applications as a clock selection criteria.

For example, in FIG. 1, in an example, the ANNOUCE PDU from the network element 12 to the network element 14 can be ANNOUCE(Class D, 229,2341 ns), and the ANNOUNCE PDU from the network element 14 to the device 30 can be ANNOUNCE(Class C, 332.4519 ns).

Figure 2:
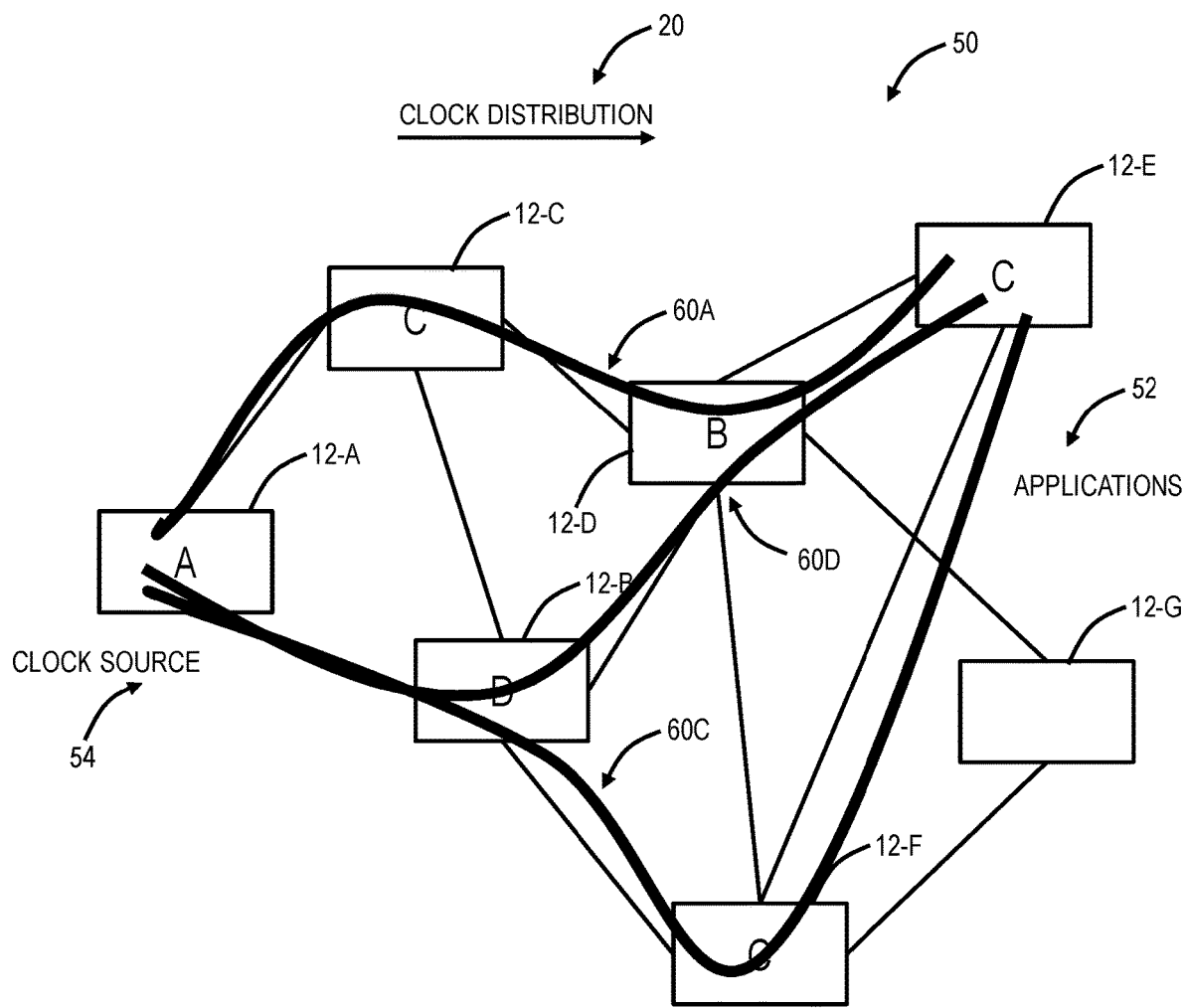
FIG. 2 is a network diagram of a network of various nodes illustrating a network use case of distribution of the clock accuracy.

FIG. 2 is a network diagram of a network 50 of various network elements 12-A-12-G. illustrating a network use case of distribution of the clock accuracy. Assume the clock distribution 20 is from the network element 12-A towards the network element 12-E, i.e., applications 52 are at the network elements 12-E, 12-G, and a clock source 54 is at the network element 12-A.

Of note, there are multiple possible paths 60 to distribute timing in the network 50, from the network element 12-A towards the network element 12-E. The objective at the network element 12-E is to determine the accuracy of the clock. For example, the network elements 12 can have different clock classes (e.g., the network element 12-A can be a class A, the network element 12-B can be a class D, the network element 12-C can be a class C, the network element 12-D can be a class D, the network element 12-E can be a class C, the network element 12-F can be class C, etc.).

Further, the multiple possible paths 60 (labeled as 60A, 60B, 60C) are all the same distance between the network elements 12-A, 12-E, in terms of hops, and this cannot be used to differentiate between the multiple possible paths 60. A next tiebreaker rule can be to choose the lower numbered port on a device. The problem is that each of the multiple possible paths 60 will produce the different accuracy, and this is not conveyed using the lowest numbered port.

The best timing path 60C is from the network elements 12-A, 12B, 12-F, 12-E, because it has the highest average class. Note, in the clock class, class D is the best class, and in this example, the best timing path 60C has a class A, D, C, C.

The present disclosure does not necessarily only contemplate choosing the timing path based on the highest average class. For example, assume the timing path 60C is experiencing degradation. The measured delta can show that the timing path 60A is actually the better timing path.

Figure 3:
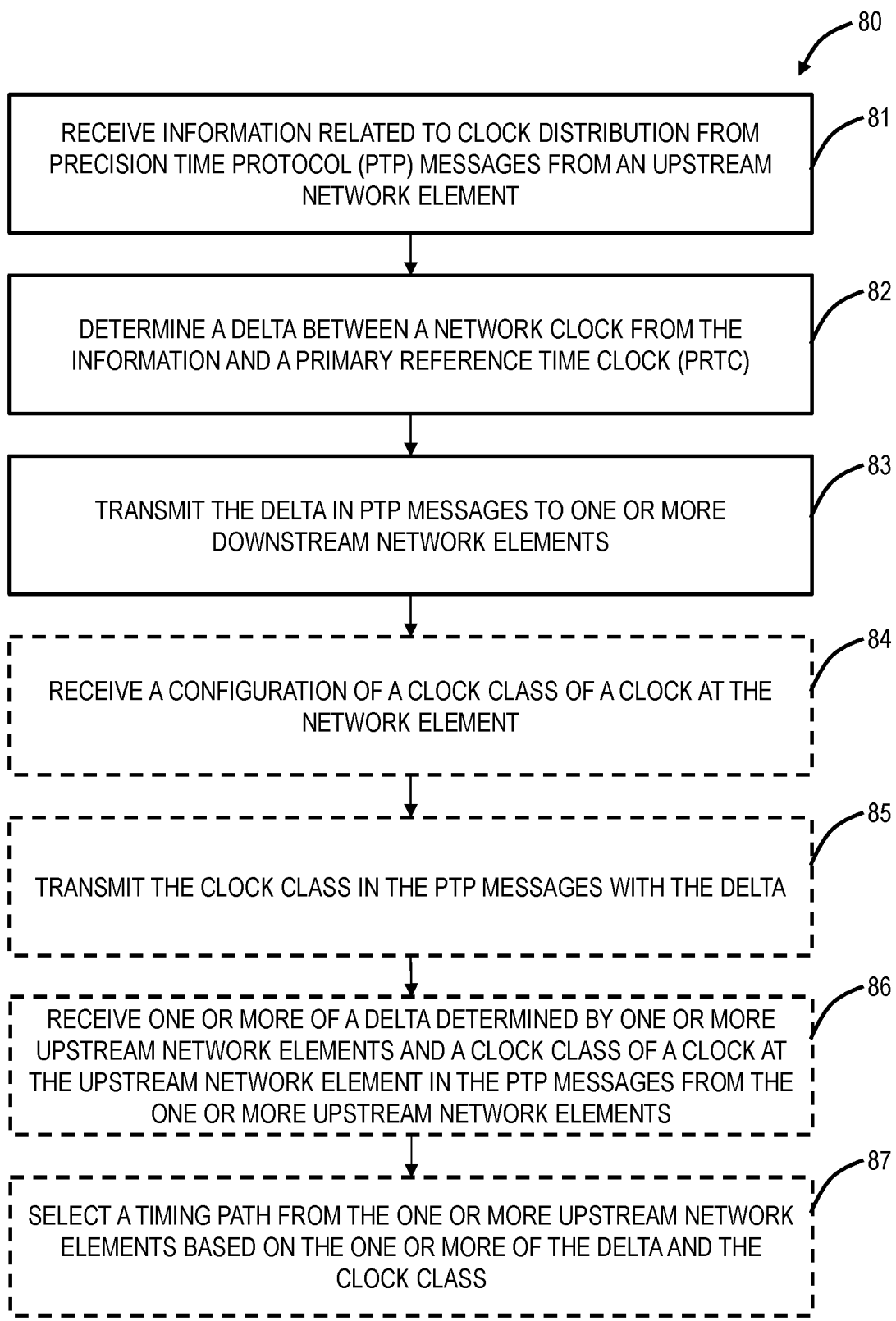
FIG. 3 is a flowchart of a process implemented by a network element for distributing clock accuracy.

FIG. 3 is a flowchart of a process 80 implemented by the network element 14 for distributing clock accuracy. The process 80 can be implemented in circuitry (hardware, software, and/or firmware) at the network element 14, as a method, and embodied as instructions stored in a non-transitory computer-readable medium.

The process 80 includes a receiving information related to clock distribution from Precision Time Protocol (PTP) messages from an upstream network element (step 81) determine a delta between a network clock from the information and a Primary Reference Time Clock (PRTC) (step 82), and transmitting the delta in PTP messages to one or more downstream network elements (step 83).

The process 80 can further include receiving a configuration of a clock class of a clock at the network element (step 84), and transmitting the clock class in the PTP messages with the delta (step 85). The clock class can be one of A, B, C, and D from G.8273.2 or G.8273.4. The downstream network elements can include a device that uses any of the delta and the clock class for applications.

The process 80 can further include receiving one or more of a delta determined by one or more upstream network elements and a clock class of a clock at the upstream network element in the PTP messages from the one or more upstream network elements (step 86), and selecting a timing path from the one or more upstream network elements based on the one or more of the delta and the clock class (step 87).

The PRTC can be a Coordinated Universal Time (UTC) from a Global Navigation Satellite System (GNSS) receiver. The PTP messages can be ANNOUNCE Protocol Data Units (PDUs). The delta can be included in a Type-Length-Value (TLV) in the PTP messages.

Figure 4:
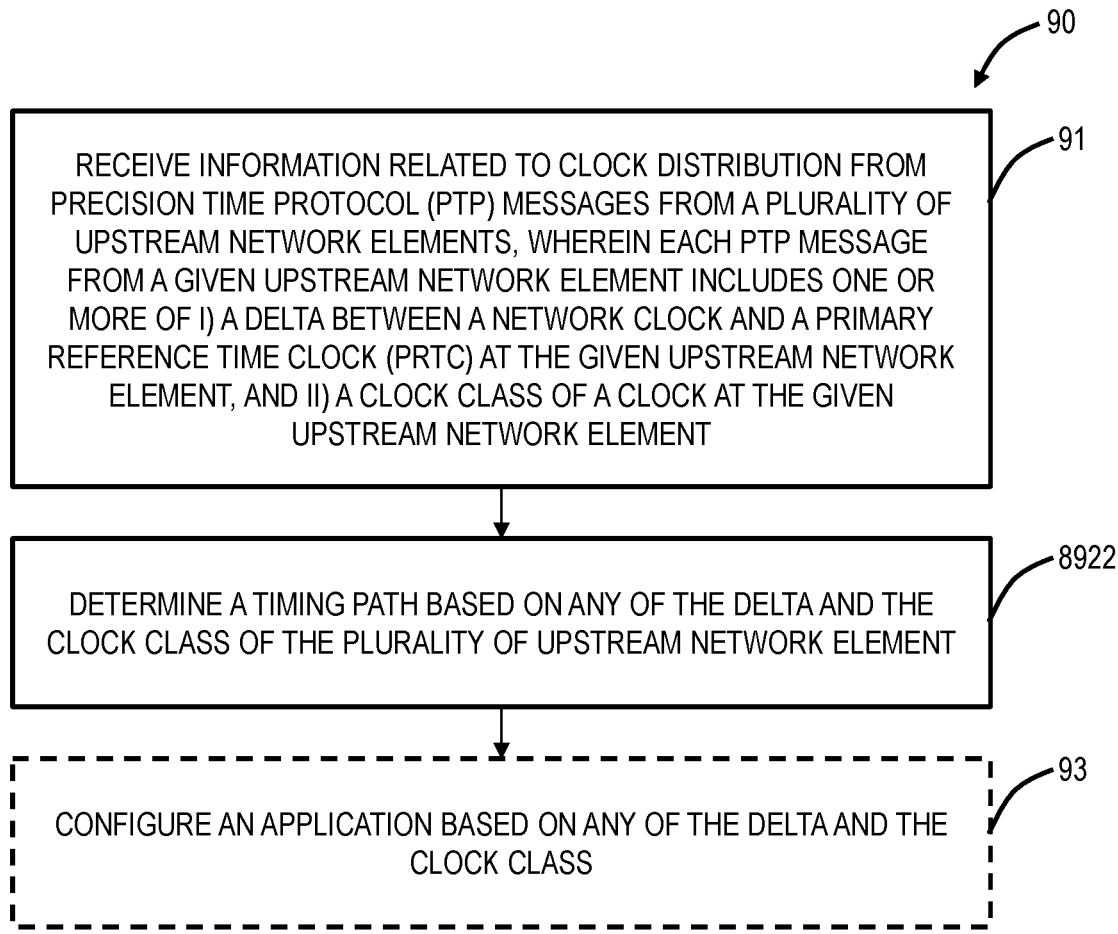
FIG. 4 is a flowchart of a process implemented by a network element for selecting a timing path based on clock accuracy.

FIG. 4 is a flowchart of a process 90 implemented by a network element for selecting a timing path based on clock accuracy. The process 80 can be implemented in circuitry (hardware, software, and/or firmware) at the device 30, as a method, and embodied as instructions stored in a non-transitory computer-readable medium.

The process 90 includes receiving information related to clock distribution from Precision Time Protocol (PTP) messages from a plurality of upstream network elements, wherein each PTP message from a given upstream network element includes one or more of i) a delta between a network clock and a Primary Reference Time Clock (PRTC) at the given upstream network element, and ii) a clock class of a clock at the given upstream network element (step 91), and determining a timing path based on any of the delta and the clock class of the plurality of upstream network element (step 92).

The process 90 can include configuring an application based on any of the delta and the clock class (step 93). The PTP messages can be ANNOUNCE Protocol Data Units (PDUs). The delta can be included in a Type-Length-Value (TLV) in the PTP messages.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A network element comprising circuitry configured to:
 receive information related to clock distribution from Precision Time Protocol (PTP) messages from one or more upstream network elements,
 determine a delta between a network clock from the information and a Primary Reference Time Clock (PRTC), wherein the delta includes a phase and time offset that collectively represents an accuracy,
 determine a clock class of a clock at the network element,
 transmit the delta and the clock class in PTP messages to one or more downstream network elements,
 wherein the information includes a delta determined by the one ore more upstream network elements and a clock class of a clock at the one or more upstream network elements, received in the PTP messages from the one ore more upstream network elements, and the circuitry is further configured to select a timing path from the one or more upstream network elements based on the information, and based on application requirements.

2. The network element of claim 1, wherein the clock class is one of A, B, C, and D from G.8273.2 or G.8273.4.

3. The network element of claim 1, wherein each of the one or more downstream network elements include a device that uses any of the delta and the clock class for applications.

4. The network element of claim 1, wherein the PRTC is Coordinated Universal Time (UTC) from a Global Navigation Satellite System (GNSS) receiver.

5. The network element of claim 1, wherein the PTP messages are signaling Protocol Data Units (PDUs).

6. The network element of claim 1, wherein the delta is included in a Type-Length-Value (TLV) in the PTP messages.

7. A method comprising:
receiving information related to clock distribution from Precision Time Protocol (PTP) messages from one or more upstream network elements,
determining a delta between a network clock from the information and a Primary Reference Time Clock (PRTC), wherein the delta includes a phase and time offset that collectively represents an accuracy,
determine a clock class of a clock at the network element,
transmitting the delta and the clock class in PTP messages to one or more downstream network elements,
wherein the information includes a delta determined by the one ore more upstream network elements and a clock class of a clock at the one ore more upstream network elements, received in the PTP messages from the one ore more upstream network elements, and the steps further include selecting a timing path from the one ore more upstream network elements based on the information, and based on application requirements.

8. The method of claim 7, wherein the clock class is one of A, B, C, and D from G.8273.2 or G.8273.4.

9. The method of claim 7, wherein each of the one or more downstream network elements include a device that uses any of the delta and the clock class for applications.

10. The method of claim 7, wherein the PRTC is Coordinated Universal Time (UTC) from a Global Navigation Satellite System (GNSS) receiver.

11. The method of claim 7, wherein the PTP messages are signaling Protocol Data Units (PDUs).

12. The method of claim 7, wherein the delta is included in a Type-Length-Value (TLV) in the PTP messages.

13. A network element comprising circuitry configured to:
receive information related to clock distribution from Precision Time Protocol (PTP) messages from a plurality of upstream network elements, wherein each PTP message from a given upstream network element includes a delta between a network clock and a Primary Reference Time Clock (PRTC) at the given upstream network element, wherein the delta includes a phase and time offset that collectively represents an accuracy, and ii) a clock class of a clock at the given upstream network element,
determine a timing path based on the delta and the clock class of the plurality of upstream network element, and based on application requirements, and
configure the application based on the information.

14. The network element of claim 13, wherein the PTP messages are signaling Protocol Data Units (PDUs).

15. The network element of claim 13, wherein the delta is included in a Type-Length-Value (TLV) in the PTP messages.

* * * * *